(No Model.)
G. LUTHY.
PROCESS OF PREPARING STARCH.
No. 346,820. Patented Aug. 3, 1886.
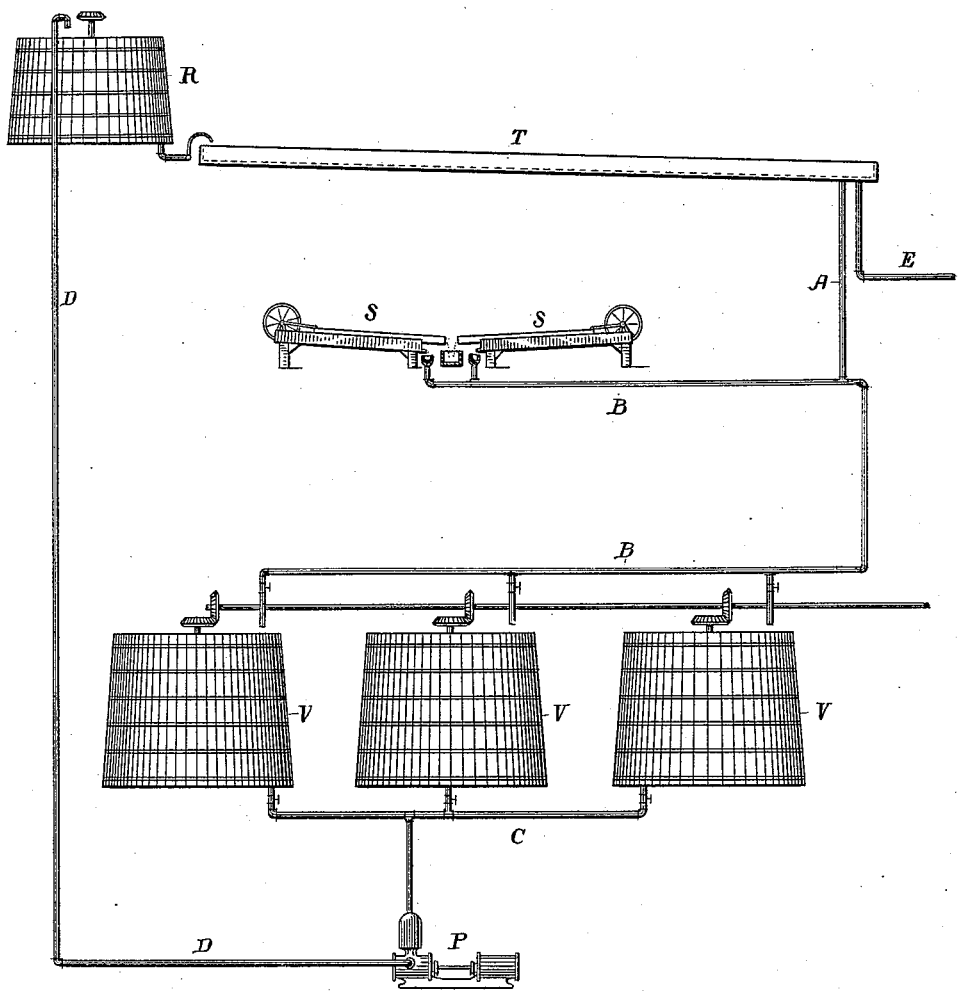

UNITED STATES PATENT OFFICE.

GODFREY LUTHY, OF PEORIA, ILLINOIS, ASSIGNOR OF TWO-THIRDS TO CHARLES T. LUTHY AND FERDINAND LUTHY, BOTH OF SAME PLACE.

PROCESS OF PREPARING STARCH.

SPECIFICATION forming part of Letters Patent No. 346,820, dated August 3, 1886.

Application filed November 2, 1885. Serial No. 181,625. (No model.)

*To all whom it may concern:*

Be it known that I, GODFREY LUTHY, of Peoria, in the county of Peoria, in the State of Illinois, have invented a certain Improvement in the Process of Preparing Starch; and I do hereby declare that the following is a full, clear, and exact description thereof, reference being had to the annexed drawing, making a part of this specification, in which like letters of reference refer to like parts, and in which the figure represents an elevation of the apparatus used in the process.

Although the improvement which I have effected can be made use of in the manufacture of corn-starch designed for food or laundry purposes, I particularly design it to perfect the quality and quantity of the starch which is to be subsequently converted into grape-sugar, and it is hence an improvement in the manufacture of glucose.

The ordinary process of preparing starch in the manufacture of glucose is as follows: The corn, previously softened by steeping, is ground in burr-stones having a stream of water running upon them, and the resulting pulpy mass or grind, after being collected in tubs, is conveyed to the shakers. By means of these shakers, which consist of inclined vibrating frames having bolting-cloth stretched thereupon and upon which sprays of water are kept showering, the starch with the gluten and some other impurities, is separated from the remaining refuse of the meal and conveyed to settling-tubs. When settled, all or nearly all the water is drawn off therefrom, the starchy precipitate is transferred to other tubs, and therein agitated with a supply of caustic or alkali, the object of which is to loosen the starch or starchy granules from the glutinous matter and other impurities. It is thence pumped to distributing-tubs, from which it is allowed to flow in small streams over slightly-inclined tables, which may be described as long narrow water-tight depressions in the floor. The starch, by reason of its greater gravity, settles in somewhat firm masses upon the bottom of the tables, while the water, carrying with it the gluten and other impurities, passes off through an outlet at the lower end of each table and thence to the sewer. When it becomes necessary to wash off the starch-surface or to wash the tables after the removal of the settled starch, the said sewer-outlets are closed and others near the same opened, whereby to convey this wash-water to the wash-water receptacles. This wash-water, which is rich in starch and also unfortunately rich in gluten, is permitted to settle, the water drawn off, caustic added, and then run by itself over settling-tables. In connection with the latter part of this process occur the following loss and difficulties: If, while the starchy mass is flowing over the tables, there should be, as so often is, some improper working, and gluten and other impurities should lodge upon the starch in unusual quantities, or if the starch was found to be flowing off at the lower ends of the tables and wasted, then the sewer-outlets are at once closed and the outflowing stream conducted to the wash-water tubs. For as soon as unusual depressions form in the starch by ripples or eddies and the gluten and other impurities lodge therein the starch-surface must be scraped and washed off and the said depressions leveled up. During this considerable starch would of course be carried off and lost were not the outlets changed, as above stated. When the tables are again working well, the outlets are changed back and the gluten and impurities again run to the sewers; but as the work of recovering the starch from the wash-water is quite a laborious and uncertain one, from reasons hereinafter set forth, the attendants are extremely apt to be thereby deterred from washing and cleaning the starch-surface as often as is really necessary for the production of first-class starch. It is also the case that at some times the wash-tubs become filled with the wash-water, so that subsequently sent down from the tables has to be discharged into the sewer and so lost with all its contained starch.

Owing to the large proportion of gluten and other impurities present in the wash-water it becomes necessary to add considerable alkali to the same, in order to separate the starch therefrom. Very often, even after the addition of large amounts of the alkali, the starch still refuses to separate and the entire mass must be run out into the sewer, and not only the starch lost but all the added alkali, which not seldom exceeds by five times the amount of alkali usually added to the starch-water. The starch, if separated at last from the wash-water after much trouble and expense, is inferior to that of the first part of the process, and consequently must be sold by itself at a less figure; or if mixed with that which is to be converted into glucose considerably reduces the quality of the whole.

To do away with all this loss in material and labor I have devised the improvement in the process which consists, essentially, in running the wash-water from the tables to the settling-vats.

To make this more plain I refer to the accompanying drawing, in which S S represent the shakers. B is the pipe by which the starch-water is conducted therefrom to the settling-vats V. The pump P forces the contents of said vats up into the discharge-tubs R, from which the starch-water can flow to the tables T. At the lower ends of the tables T pipes E run the waste off to the sewer, and the pipe or pipes A convey the wash-water from the tables to the pipe B, which conducts the starch-water to the settling-vats V. It will thus be seen that whenever it becomes necessary to clean and scrape off the starch-surface of the tables and to wash out the table the pipe E, which is ordinarily open, as above described, is closed and the pipe A opened, so that said wash-water shall flow directly to the settling-vats with the starch-water. In this way there is no further labor required for the wash-water, it being treated with the starch-water and none of it need be lost. In addition to this obviating all the objectionable features of the process in which the wash-water has its own separate treatment, I find that by the presence of the small proportion of the alkali accompanying the wash-water, the starch-water is enabled to settle in the vats V with much greater celerity and more thoroughly than is the case when the said starch-water is alone.

In the drawing I have not shown the mill, nor have I shown the extra tubs in which the starch is ordinarily treated with the alkali, for I often treat the starch after the partial removal of the water in the settling-vats V themselves.

What I claim as my invention, and for which I desire Letters Patent, is as follows, to wit:

1. The herein-described improvement in the process of preparing starch, which improvement consists, essentially, in conducting the washings from the starch-tables to the settling-vats which receive the starch-liquor from the shakers, and together treating the starch-liquor and washings with the alkaline solution ordinarily employed, substantially as and for the purpose set forth.

2. The herein-described improvement in the process of preparing starch, which improvement consists in conducting the washings from the starch-tables to the conduit which carries the starch-liquor from the shakers to the settling-vats, thereby thoroughly intermixing the washings and starch-liquor, and then treating the same together with the usual alkaline solution, as and for the purpose specified.

In testimony that I claim the foregoing as my invention I have hereunto set my hand this 28th day of October, 1885.

GODFREY LUTHY.

In presence of—
A. B. UPHAM,
H. W. WELLS.